(12) United States Patent
Flick

(10) Patent No.: US 10,131,250 B2
(45) Date of Patent: Nov. 20, 2018

(54) ACTUATING UNIT FOR A VEHICLE SEAT

(71) Applicant: Johnson Controls Technology Company, Holland, MI (US)

(72) Inventor: Joachim Flick, Húckeswagen (DE)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 837 days.

(21) Appl. No.: 14/403,280

(22) PCT Filed: May 10, 2013

(86) PCT No.: PCT/EP2013/059747
§ 371 (c)(1),
(2) Date: Nov. 24, 2014

(87) PCT Pub. No.: WO2013/178449
PCT Pub. Date: Dec. 5, 2013

(65) Prior Publication Data
US 2015/0107403 A1 Apr. 23, 2015

(30) Foreign Application Priority Data

May 30, 2012 (DE) .......... 10 2012 104 664
Oct. 25, 2012 (DE) .......... 10 2012 110 208

(51) Int. Cl.
*B60N 2/08* (2006.01)

(52) U.S. Cl.
CPC ......... *B60N 2/0806* (2013.01); *B60N 2/0818* (2013.01); *B60N 2/0843* (2013.01); *Y10T 74/20666* (2015.01)

(58) Field of Classification Search
CPC ... B60N 2/0806; B60N 2/0875; B60N 2/0705
See application file for complete search history.

(56) References Cited

U.S. PATENT DOCUMENTS

| 4,449,752 | A | | 5/1984 | Yasumatsu et al. | |
|---|---|---|---|---|---|
| 5,028,028 | A | * | 7/1991 | Yamada | B60N 2/071 248/430 |
| 5,971,342 | A | * | 10/1999 | Sakai | B60N 2/0705 248/429 |

(Continued)

FOREIGN PATENT DOCUMENTS

| CN | 1 167 700 A | 12/1997 |
|---|---|---|
| CN | 1 198 387 A | 11/1998 |

(Continued)

OTHER PUBLICATIONS

EPO Machine Translation of WO2011085768, Schmale et al., Jul. 2011.*

(Continued)

*Primary Examiner* — Vinh Luong
(74) *Attorney, Agent, or Firm* — McGlew and Tuttle, P.C.

(57) ABSTRACT

An actuating unit for a vehicle seat, particularly for actuating a locking device of a seat rail of a motor vehicle seat, has an actuating element (4) articulated about a pin (6) to a main element (2). A spring element (10) is arranged on the pin (6) and biases the actuating element. The spring element and the pin are formed such that the spring element secures the pin in the assembled position thereof.

18 Claims, 3 Drawing Sheets

(56) References Cited

U.S. PATENT DOCUMENTS

| | | | | |
|---|---|---|---|---|
| 6,126,133 | A * | 10/2000 | Timon | B60N 2/0705 248/429 |
| 6,257,541 | B1 * | 7/2001 | Timon | B60N 2/0705 248/424 |
| 6,354,553 | B1 * | 3/2002 | Lagerweij | B60N 2/0715 248/429 |
| 9,481,266 | B2 * | 11/2016 | Kim | B60N 2/0705 |
| 9,789,789 | B2 * | 10/2017 | Akutsu | B60N 2/12 |
| 2004/0011940 | A1 * | 1/2004 | Matsumoto | B60N 2/071 248/424 |
| 2007/0001498 | A1 * | 1/2007 | Bauersachs | B60N 2/0806 297/341 |
| 2010/0327139 | A1 * | 12/2010 | Wojatzki | B60N 2/0705 248/429 |
| 2011/0042540 | A1 * | 2/2011 | Becker | B60N 2/0705 248/429 |
| 2014/0239141 | A1 * | 8/2014 | Yamada | B60N 2/08 248/430 |
| 2016/0185260 | A1 * | 6/2016 | Kim | B60N 2/0875 248/429 |
| 2016/0193942 | A1 * | 7/2016 | Kim | B60N 2/0875 248/429 |

FOREIGN PATENT DOCUMENTS

| | | | |
|---|---|---|---|
| CN | 2 465 980 | Y | 12/2001 |
| CN | 1 461 711 | A | 12/2003 |
| DE | 10 2008 017 007 | A1 | 1/2009 |
| DE | 10 2009 060431 | A1 | 6/2011 |
| GB | 2 317 558 | A | 4/1998 |
| JP | S58016927 | A | 1/1983 |
| JP | H10095254 | A | 4/1998 |
| JP | 2009-67345 | * 4/2009 | ........... B60N 2/0875 |
| JP | 2012-158201 | A | 8/2012 |
| WO | 2009/132944 | A1 | 11/2009 |
| WO | 2011-085768 | A1 | 7/2011 |

OTHER PUBLICATIONS

Define flange—Google Search, google.com., Aug. 11, 2017.*
Define leg springs—Google Search, google.com., Aug. 12, 2017.*
Define having—Google Search, Feb. 18, 2018.*
Korean Office Action. dated Apr. 20, 2016.

* cited by examiner

ACTUATING UNIT FOR A VEHICLE SEAT

CROSS REFERENCE TO RELATED APPLICATIONS

This application is a United States National Phase Application of International Application PCT/EP2013/059747 filed May 10, 2013 and claims the benefit of priority under 35 U.S.C. § 119 of German Patent Applications DE 10 2012 104 664.6 filed May 30, 2012 and DE 10 2012 110 208.2 filed Oct. 25, 2012, the entire contents of which are incorporated herein by reference.

FIELD OF THE INVENTION

The invention relates to an actuating unit for a vehicle seat, in particular for actuating a locking device of a seat rail of a motor vehicle seat, comprising: an actuating element articulated via a pin on a base element; and a spring element arranged on the pin and pretensioning the actuating element.

BACKGROUND OF THE INVENTION

Vehicle seats are generally mounted in a vehicle on a seat rail pair consisting of an upper seat rail and a lower seat rail, wherein the upper seat rail which bears the vehicle seat may be displaced relative to the lower seat rail which is fixedly attached to the vehicle, in order to adjust the position of the vehicle seat in the vehicle.

In order to fix the vehicle seat in a position set by a user, a locking device is required as part of a device for the adjustment. In this case, said locking device has to be configured in order to be able to be released automatically or manually, so as to permit the adjustability of the vehicle seat along the seat rail pair, if required, and to be able to ensure a secure retention of the vehicle seat on the vehicle structure during operation.

Actuating units for a vehicle seat which are used to this end and which, in particular, are used on a seat rail pair of a motor vehicle seat are known in many different embodiments from the prior art. In such a mechanism, typically a rigid actuating element is pushed through an opening in the seat rail bearing the vehicle seat and pivotably articulated on the seat rail via an axle, wherein one end of the actuating element actuates a locking device, whilst the other end of the actuating element is actuated manually by the user or automatically controlled. In particular, in this case actuating elements to be actuated manually are frequently retained by a spring element in a predetermined pivoted position.

In this case, the actuating element is secured on the axle or shaft bearing the seat rail against axially slipping out, for example by means of a suitable fastening means, namely a nut or a cotter pin, which however requires a complicated, time-consuming and thus cost-intensive assembly.

Alternatively, for securing the position of the axle or shaft, the ends thereof may be reshaped, for example compressed, which not only results in a complicated assembly process but also leads to damage to the axle or at least damage to a coating of paint or a protective coating applied thereto, whereby the functionality and service life of the actuating unit is restricted.

Moreover, devices of the prior art are also known in which the actuating element is not retained by an axle but by a leg spring of complex shape, frequently in combination with a further multipart mechanism, whereby the installation of the device is particularly complicated and cost-intensive and therefore may only be carried out manually by an operator.

SUMMARY OF THE INVENTION

An object of the invention is to provide a simple and cost-effective actuating unit for a vehicle seat which consists of only a few components and may be automatically assembled due to its simple construction.

The actuating unit for a vehicle seat according to the invention comprises an actuating element which is pivotably attached via a pin to a base element.

A spring element is arranged on the pin, said spring element at one end being in contact with the base element and at another end being in contact with the actuating element and generally pretensioning the actuating element in the direction of a locked position of the locking device, whereby the spring element additionally prevents the pin from slipping out from its assembled position relative to the base element and on the actuating element in a particularly simple manner.

The actuating unit for a vehicle seat according to the invention, therefore, comprises only a small number of components, whereby the production and assembly may be carried out in a simple manner and at low cost. In particular, the simple but exceptionally efficient fastening of the pin to the base element and to the actuating element by means of the spring element permits fully automatic assembly in few operating steps which, in the case of a more complex mechanism, would only be possible to a limited degree and at great expense.

The base element may in principle be any component, but in particular may be a seat rail of a seat rail pair. The base element may be of any shape and may be formed from any material, namely metal, plastics, a material compound or a composite material.

The base element in this case has at least one retaining device, preferably at least two retaining devices, for the pin. The retaining device in this case may in principle be formed from any material and may consist of any number of components.

Preferably, the base element has a recess, the actuating element being arranged so as to protrude through said recess, wherein the recess is of sufficient dimensions for the actuating element to be able to carry out its function inside the recess. The actuating element in this case has on one side of the base element an actuating region. The effect of the actuation of this region is then directly transmitted to an active region on the opposing side of the base element.

The actuating element may be formed from any stable material, namely metal, plastics or a composite material. In this case, the actuating element may have any shape and be formed in one piece or as a sub-assembly from a plurality of components. The actuating element may be provided individually for actuating a locking mechanism or a further individual device or fulfill at least one further function. Preferably, in this case the actuating element is formed in one piece from metal, particularly preferably as a substantially stamped metal profile.

The active region of the actuating element is preferably arranged in a region of the actuating element which, relative to the actuating region, is located on the opposing side of the actuating element guided through the recess of the base element. Particularly preferably, the active region of the actuating element is located on a side of the base element opposing the pin.

For attaching the pin to the actuating element, at least one retaining element is provided for receiving and/or fastening by a positive, non-positive and/or material connection, for example by welding, bonding, fastening by means of a thread, a screw, a nut, a cotter pin, by compressing or by driving the pin into a pin hole having a smaller diameter. According to a preferred embodiment of the invention, the retaining element is formed as a receiver bushing with a pin hole, through which the pin may be pushed.

In this case, the pin may be formed from any material, namely metal, plastics, ceramics or a composite material and preferably has a diameter of between 2 mm and 5 mm, particularly preferably between 3 mm and 4 mm, quite particularly preferably 3.5 mm.

The spring element may also be formed from any material, namely metal, ceramics, plastics or a composite material. In this case, the one end of the spring element is attached directly or via a further component to the base element and the other end of the spring element is attached directly or via a further component to the actuating element, wherein the attachment of the spring element may take place in any manner by a positive, non-positive and/or material connection, for example by screwing, welding, bonding, by means of a cotter pin, by compressing or by reshaping the spring end.

According to a particularly advantageous development of the invention, the recess is dimensioned in the base element such that the maximum possible pivoting of the actuating element about the pin is limited, in particular by a surface of the actuating element and an edge of the recess coming into contact with one another from a predefined pivoting angle.

According to an advantageous development of the invention, one end of the spring element is guided through an opening in the base element and particularly preferably fixed there, for example by bending back the spring end. Further preferably, the shape and size of the opening substantially correspond to the cross-sectional surface of the spring end, wherein the opening particularly preferably has a circular shape.

According to an advantageous development of the invention, the other end of the spring element is supported against a support element of the actuating element, wherein the support element is particularly preferably configured as a projection protruding from the actuating element.

According to an advantageous development of the invention, the projection on the actuating element on which one end of the spring element is articulated or fastened protrudes out of the surface of the actuating element or protrudes therefrom, wherein particularly preferably the projection protrudes therefrom to the side in a direction parallel to the main axis of the pin and quite particularly preferably has a notch by which the end of the spring element is retained.

According to a further advantageous development of the invention, the retaining device for the pin on the base element is shaped as a bearing bracket, which is formed integrally with the base element or as a component attached thereto but is preferably formed integrally therefrom by means of reshaping. Further preferably, the pin is arranged on the base element by at least two bearing brackets spaced apart from one another.

In principle, the bearing bracket may in this case be formed from any material, namely metal, plastics or a composite material, preferably being formed from the same material as the base element and quite particularly preferably being configured integrally with the base element.

According to a further advantageous development of the invention, the bearing brackets are formed integrally from the base element directly on the edge of the recess, wherein the recess is preferably formed by reshaping the base element for producing the bearing brackets.

The bearing bracket has a receiver opening having a diameter which is larger than or the same as the diameter of the pin. Quite particularly preferably, the shape of the receiver opening corresponds to a cross-sectional surface of the pin at right angles to the main axis thereof.

According to a preferred embodiment of the invention, the receiver bushing for attaching the pin to the actuating element is formed integrally therewith. However, it is also conceivable that the receiver bushing is arranged on a separate component attached to the actuating element. In this case, the diameter of the pin hole is at least the same size as the diameter of the pin.

According to a particularly preferred development of the invention, however, the diameter of the pin hole is slightly larger than the diameter of the pin so that the pin may be freely rotated in the pin hole, wherein quite particularly preferably a bearing is provided for the pin. Moreover, a further development of the invention is conceivable which has a separate bearing component between the pin hole and pin, namely a ball bearing, rolling bearing or plain bearing.

According to a preferred embodiment of the invention, the receiver bushing of the actuating element is arranged with the pin hole between the two bearing pockets of the base element.

According to an advantageous development of the invention, the pin is formed from metal and preferably has a smooth surface structure at least in the regions which are guided through the receiver opening of the bearing bracket and/or through the pin hole of the actuating element. Particularly preferably, the pin is surface-coated, for example with a paint, a polymer coating, an oxide coating or metal coating, which has a chemical composition which is different from the pin.

According to a preferred embodiment of the invention, the pin is arranged substantially parallel to the surface of the base element, so that the pivoting movement of the actuating element which is able to be performed about the pin may take place substantially at right angles to the surface of the base element.

According to a preferred development of the invention, the pin has a flange, wherein particularly preferably the pin extends on both sides of the flange. Quite particularly preferably, the pin is arranged such that the flange bears at one side against a part of the base body or against a part of the actuating element, preferably against the retaining element for the pin or against a surface of the bearing bracket, wherein quite particularly preferably the contact is made over the entire surface. Moreover, quite particularly preferably, the other side of the flange is in contact with the spring element, whereby the pin is effectively secured against slipping in both directions along its main axis, in a particularly simple manner.

In principle, according to this development of the invention the flange may be of any shape, but preferably the flange has planar side surfaces on both sides which are particularly preferably arranged at right angles to the main axis of the pin. In this case, the flange may be formed integrally with the pin or as a separate component may be attached thereto in any manner by a positive, non-positive and/or material connection.

According to a further advantageous development of the invention, the spring element is a leg spring which is preferably arranged coaxially to the pin, particularly preferably in the region of one of the ends of the pin and in this case is quite particularly preferably in contact on one side with the flange of the pin. In this case, the spring is preferably under tension, preferably in every actuating state of the actuating element.

According to an advantageous embodiment of the invention, the spring element is a symmetrical leg spring, whereby the assembly is facilitated and fully automatic installation is possible in a particularly simple manner, as the direction of installation of the spring element is immaterial.

According to an advantageous embodiment of the invention, the two spring ends are configured as straight or bent legs. In principle, however, said legs may also be formed in any other manner, for example, as eyes, flattened surfaces, bent-back legs and/or any fastening means.

An exemplary embodiment of the invention is described in more detail hereinafter with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
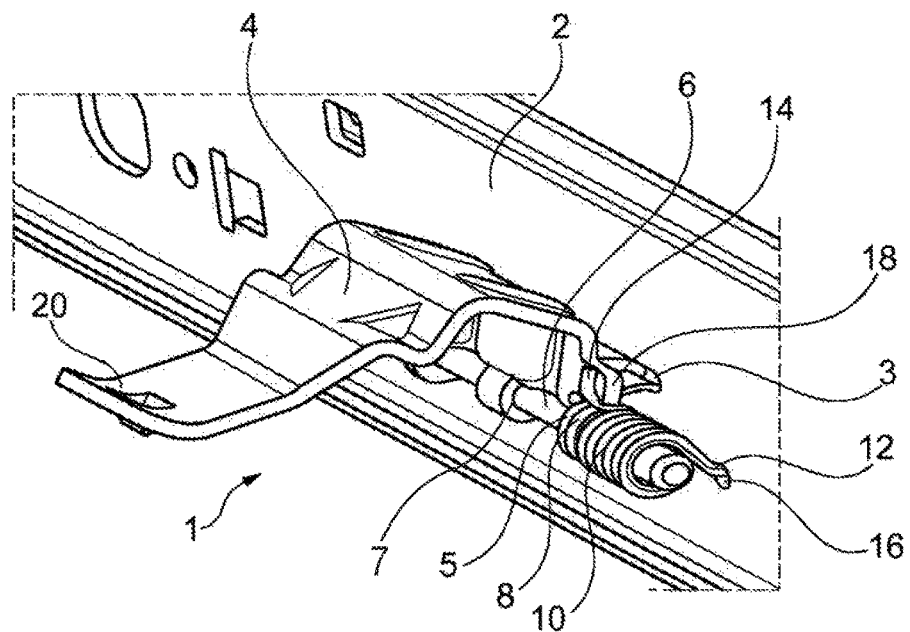
FIG. 1 is a perspective view of an embodiment of an actuating unit for a vehicle seat.

An embodiment of an actuating unit 1 shown in FIG. 1, for a vehicle seat, in particular for actuating a locking unit to a seat rail 2 on a motor vehicle seat, has an actuating lever 4 which is pivotably arranged by means of a bearing pin 6 attached to one side of a seat rail 2.

The seat rail 2 is an upper seat rail 2 of a seat rail pair fixedly connected to a vehicle seat in a motor vehicle, said seat rail being substantially manufactured from metal and in the region of the actuating unit 1 having a recess 3 through which the actuating lever 4 is guided through the seat rail 2.

Figure 2:
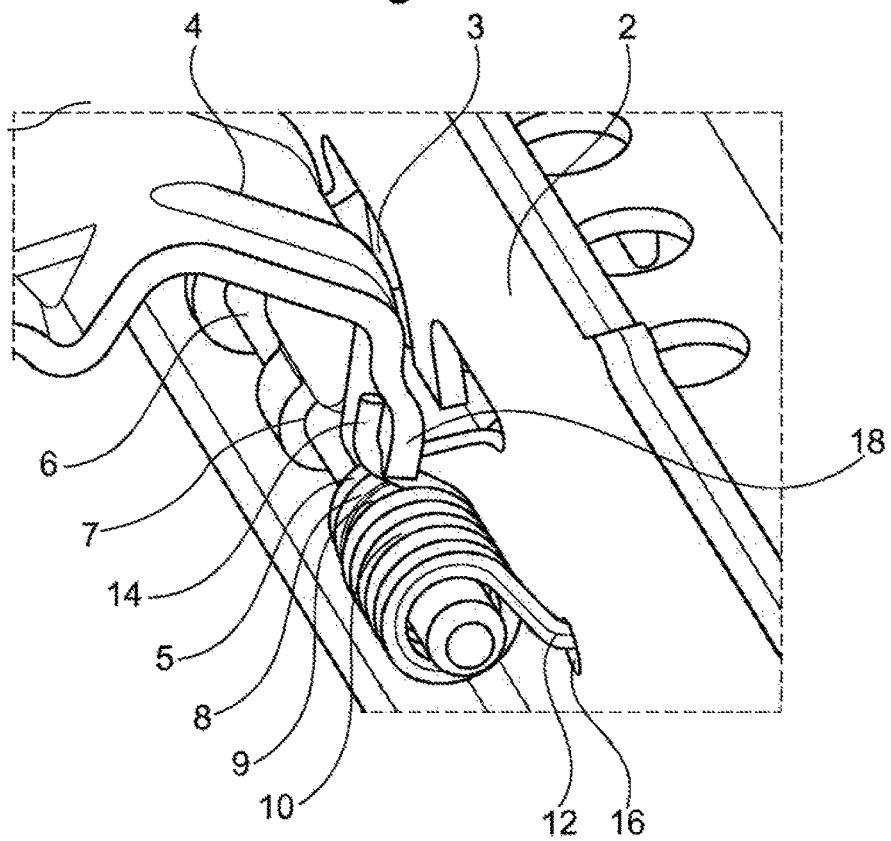
FIG. 2 is a perspective enlarged partial view of the embodiment shown in FIG. 1.
Figure 3:
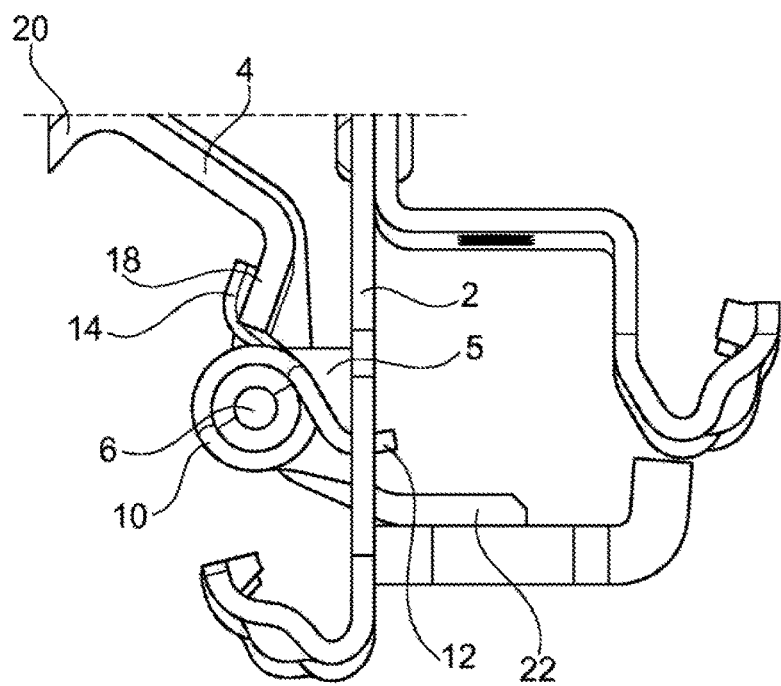
FIG. 3 is a perspective view of the embodiment shown in FIG. 1 in the direction of the extent of a base element.
Figure 4:
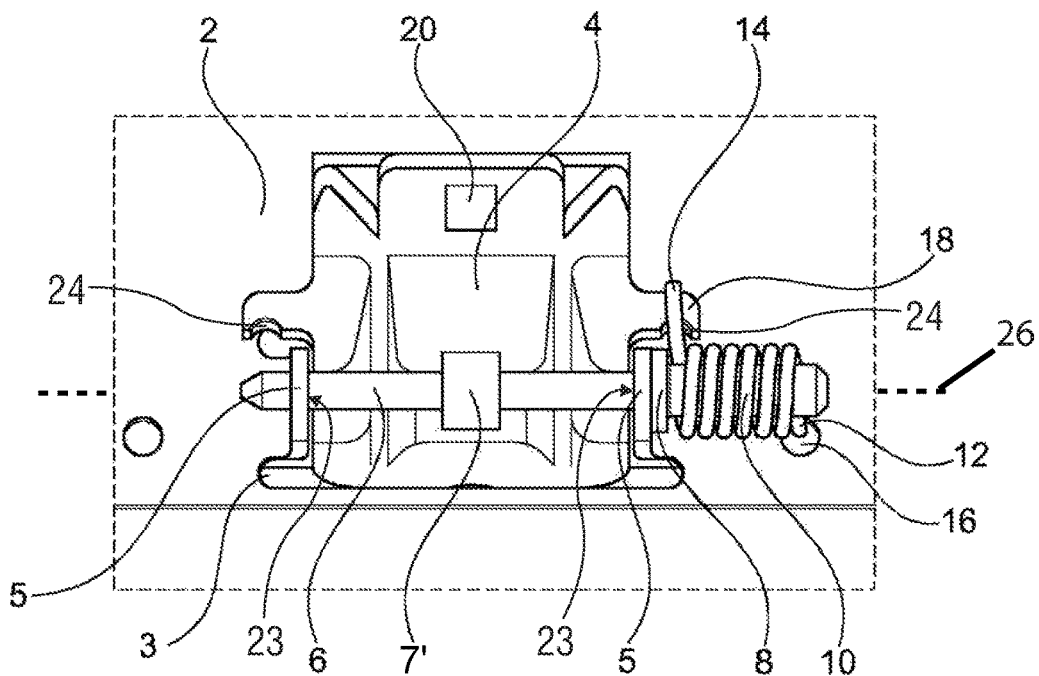
FIG. 4 is a perspective view of an embodiment rotated by 90° relative to the view in FIG. 3 in the horizontal.
Figure 5:
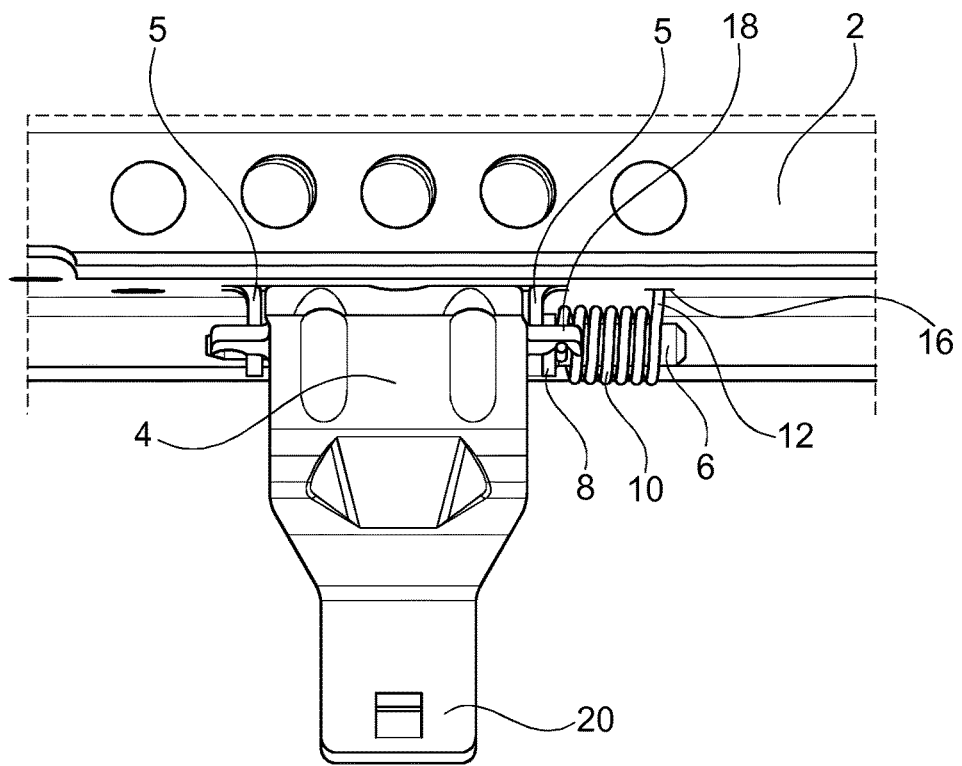
FIG. 5 is a perspective view of the embodiment of the actuating unit shown in FIG. 4 rotated by 90° relative to the view in FIG. 4 in the vertical.

The metal actuating lever 4 is guided through the recess 3 in the seat rail 2 and has a repeatedly bent-back shape as may be particularly clearly seen in FIGS. 1, 2 and 3. In this case, the actuating lever 4 has on the side of the seat rail 2 opposing the bearing pin 6 an active region 22 which may cooperate with a locking mechanism of the seat rail pair (not shown in the figures).

The metal bearing pin 6 is guided through circular stamped openings 23 in two bearing brackets 5 formed integrally on the seat rail 2 and through a pin hole 7 of a receiver bushing 7' produced by the actuating lever 4, whereby the main axis 26 of the bearing pin 6 extends virtually parallel to an envisaged direction of movement of the seat rail 2 and permits a pivoting of the actuating lever 4 about the main axis of the bearing pin 6 relative to the seat rail 2. In this case, the bearing pin 6 has a diameter of 3.5 mm.

In the region of one of the ends of the bearing pin 6 a metal leg spring 10 with a plurality of windings is coaxially arranged about the bearing pin 6. The one leg 12 of the leg spring 10 is guided through an opening 16 in the seat rail 2 and slightly bent-back there, as may be clearly seen in FIG. 3. The other leg 14 of the leg spring 10 is supported against a retaining projection 18 which is integrally formed to the side on the actuating lever 4, whereby the leg spring 10 clamps the actuating lever 4 continuously relative to a pivoting movement about the bearing pin 6. The retaining projection 18 includes a notch 24.

The bearing pin 6 has a bearing flange 8 which is integrally formed on the bearing pin 6 and spaced apart from both ends thereof and has two bearing surfaces 9 at right angles to the main axis of the bearing pin 6.

During the assembly of the actuating unit for a vehicle seat 1, the bearing pin 6 is guided sufficiently far through the bearing brackets 5 and through the pin hole 7 of the actuating lever 4 until the bearing flange 8 bears with one of the two bearing surfaces 9 fully against the bearing brackets 5.

On the other side of the bearing flange 8, the bearing pin 6 is surrounded by the leg spring 10 which is fixedly attached to the seat rail 2 and to the actuating lever 4, wherein the leg spring 10 bears directly against the other bearing surface 9 of the bearing flange 8 and secures said bearing flange from slipping out of the bearing brackets 5 and out of the pin hole 7 of the actuating lever 4 counter to the assembly direction.

While specific embodiments of the invention have been shown and described in detail to illustrate the application of the principles of the invention, it will be understood that the invention may be embodied otherwise without departing from such principles.

The invention claimed is:

1. An actuating unit for a vehicle seat for actuating a locking device of a seat rail of a motor vehicle seat, the actuating unit comprising:
   a base element;
   a one-piece pin formed with a flange;
   an actuating element articulated via the pin on the base element; and
   a spring element arranged on the pin and pretensioning the actuating element, wherein the spring element and the pin are configured such that the spring element secures the pin in a pin assembled position, the pin being arranged parallel to a surface of the base element, the pin extending on both sides of the flange, the pin being arranged such that the flange at one side bears at least one of against a part of the base element, against a pin retaining element part of the actuating element and against a surface of a bearing bracket, wherein another side of the flange is in contact with the spring element.

2. An actuating unit as claimed in claim 1, wherein:
   the base element has at least one retaining device for the pin; and
   the at least one retaining device is shaped as the bearing bracket which is configured integrally with the base element.

3. An actuating unit as claimed in claim 2, wherein:
   the bearing bracket has a receiver opening for receiving the pin; and a shape of the receiver opening corresponds to a cross-sectional surface of the pin at right angles to a main axis thereof.

4. An actuating unit as claimed in claim 1, wherein:
the base element has two bearing brackets;
the actuating element has a receiver bushing with a pin hole; and
the receiver bushing is arranged with the pin hole between the two bearing brackets of the base element.

5. An actuating unit as claimed in claim 1, wherein at least one of:
the base element has an opening and one end of the spring element is guided through the opening in the base element and is fixed to the base element; and
a further end of the spring element is supported against a retaining element of the actuating element wherein the retaining element is configured as a projection protruding from the actuating element.

6. An actuating unit as claimed in claim 5, wherein:
the projection on the actuating element protrudes out of a surface of the actuating element or protrudes therefrom to a side in a direction parallel to a main axis of the pin and has a notch by which the end of the spring element is retained.

7. An actuating unit as claimed in claim 1, wherein:
the base element has a recess through which the actuating element is pushed;
the recess is dimensioned such that the recess limits a maximum possible pivoting of the actuating element about the pin.

8. An actuating unit as claimed in claim 1, wherein:
the spring element is a leg spring;
two spring ends are configured as straight or bent legs;
the leg spring is arranged coaxially in a region of one of the ends of the pin and is under tension in every actuating state of the actuating element.

9. An actuating unit as claimed in claim 1, wherein the flange is integrally connected to the pin to define a one-piece pin flange structure.

10. An actuating unit as claimed in claim 1, wherein the flange is connected directly to the pin.

11. An actuating unit as claimed in claim 1, wherein the pin comprises a first pin portion and a second pin portion, the second pin portion extending between a first bearing bracket and a second bearing bracket, wherein the first bearing bracket and the second bearing bracket define a space, the second pin portion being arranged in the space, the spring engaging the first pin portion, wherein the flange, the spring and the first pin portion are located outside of the space.

12. An actuating unit for a vehicle seat for actuating a locking device of a seat rail of a motor vehicle seat, the actuating unit comprising:
a base element having a bearing bracket with a receiver opening;
a single piece pin formed with a flange;
an actuating element articulated via the pin on the base element; and
a spring element arranged on the pin and pretensioning the actuating element, the spring element and the pin being configured such that the spring element secures the pin in a pin assembled position, the pin being arranged substantially parallel to a surface of the base element, the pin extending on both sides of the flange, at least a portion of the actuating element being arranged at one side of the bearing bracket, the pin being arranged in the receiver opening such that one side of the flange engages the bearing bracket at an opposite side and another side of the flange is in contact with the spring element.

13. An actuating unit as claimed in claim 12, wherein the flange is integrally connected to the pin to define a one-piece pin flange structure.

14. An actuating unit as claimed in claim 12, wherein the flange is connected directly to the pin.

15. An actuating unit for a vehicle seat for actuating a locking device of a seat rail of a motor vehicle seat, the actuating unit comprising:
a base element having at least two bearing brackets, each of the at least two bearing brackets having a receiver opening;
a pin comprising a flange, wherein the flange is integrally connected with the pin to form a one-piece pin;
an actuating element articulated via the pin on the base element; and
a spring element arranged on the pin and pretensioning the actuating element, the spring element and the pin being configured such that the spring element secures the pin in a pin assembled position, at least a portion of the actuating element being arranged between the at least two bearing brackets, the pin being guided through the receiver opening of each of the at least two bearing brackets and through a pin hole of the actuating element, the spring element being arranged on an outer side of at least one of the at least two bearing brackets.

16. An actuating unit as claimed in claim 15, wherein the flange is connected directly to the pin.

17. An actuating unit as claimed in claim 15, wherein the pin comprises a radially extending surface, the radially extending surface defining at least a portion of the flange.

18. An actuating unit as claimed in claim 15, wherein the pin comprises a first pin portion and a second pin portion, the at least two bearing brackets comprising a first bearing bracket and the second bearing bracket, the first bearing bracket and the second bearing bracket defining a space, the second pin portion being located in said space, wherein the second pin portion extends between the first bearing bracket and the second bearing bracket, the spring engaging the first pin portion, wherein the flange, the spring and the first pin portion are located outside of the space.

* * * * *